May 22, 1962 W. S. PAWL 3,035,736
RESEARCH AND INFORMATION RETRIEVAL SYSTEM
Filed April 1, 1960 6 Sheets-Sheet 1
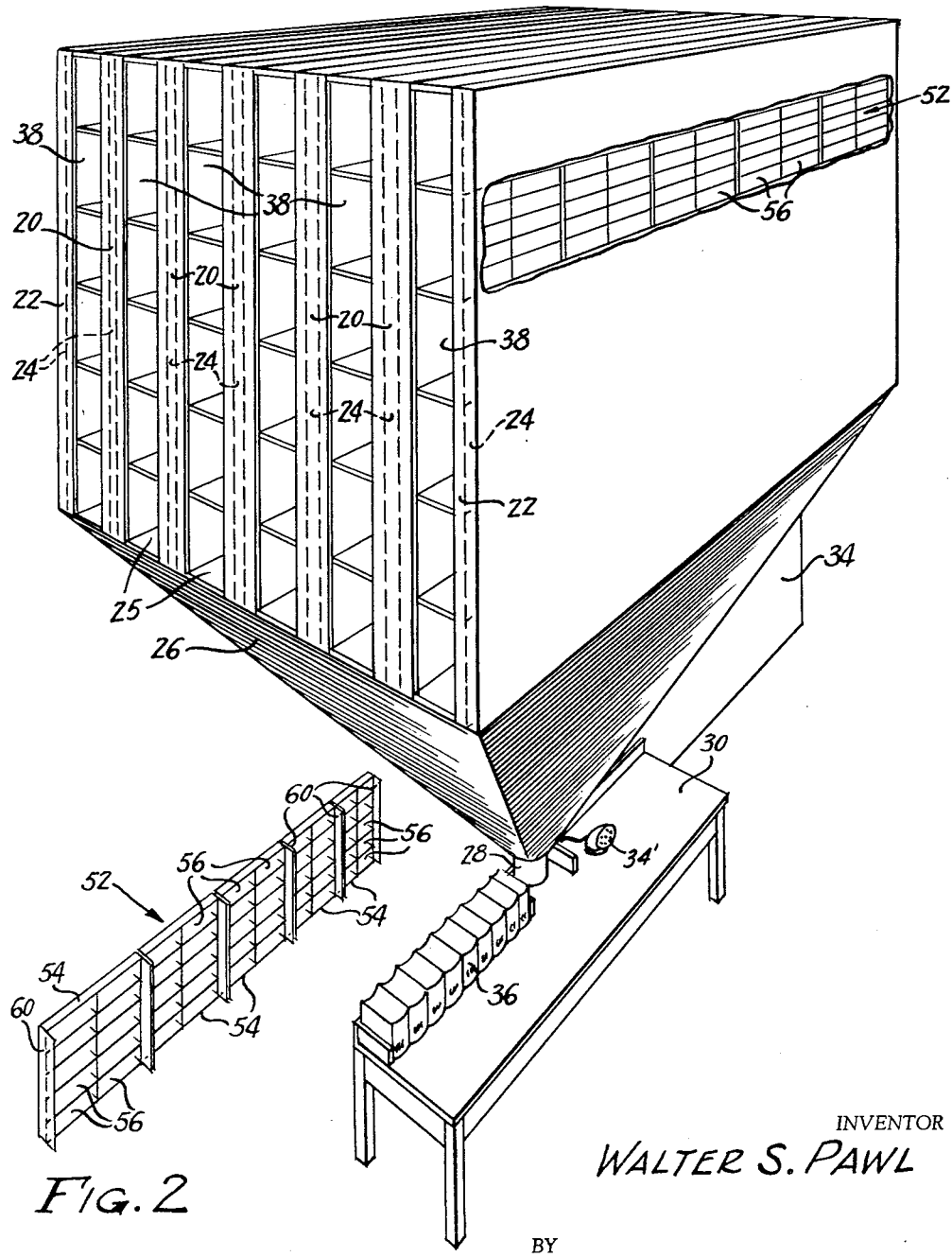
INVENTOR
WALTER S. PAWL
BY
ATTORNEY May 22, 1962 W. S. PAWL 3,035,736
RESEARCH AND INFORMATION RETRIEVAL SYSTEM
Filed April 1, 1960 6 Sheets-Sheet 2

INVENTOR
WALTER S. PAWL
BY
ATTORNEY

INVENTOR
WALTER S. PAWL
BY
ATTORNEY

INVENTOR
WALTER S. PAWL
BY
ATTORNEY

May 22, 1962 W. S. PAWL 3,035,736
RESEARCH AND INFORMATION RETRIEVAL SYSTEM
Filed April 1, 1960 6 Sheets-Sheet 5

INVENTOR
WALTER S. PAWL

BY

ATTORNEY

May 22, 1962 W. S. PAWL 3,035,736
RESEARCH AND INFORMATION RETRIEVAL SYSTEM
Filed April 1, 1960 6 Sheets-Sheet 6
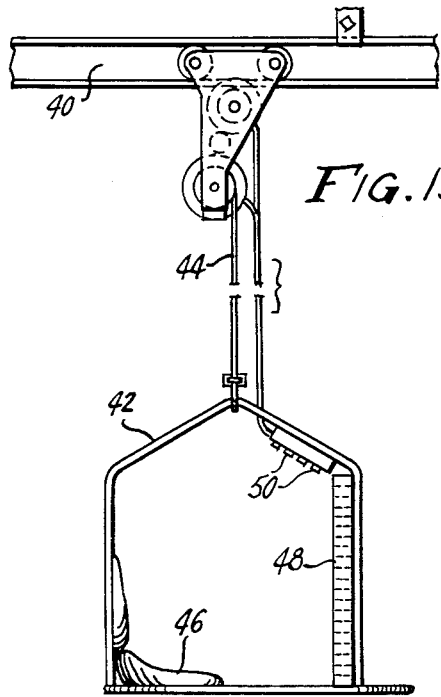
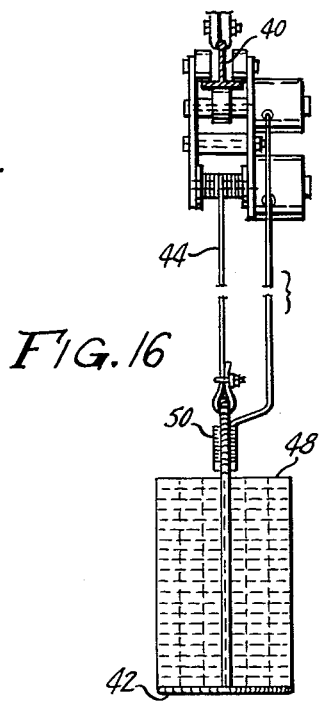
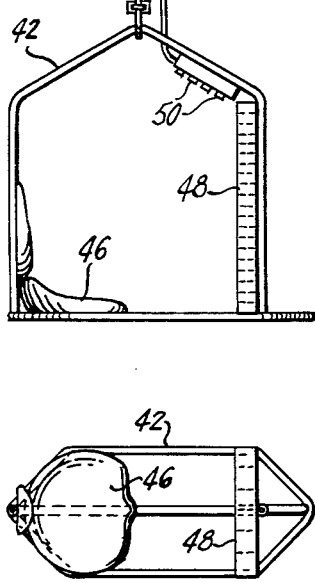
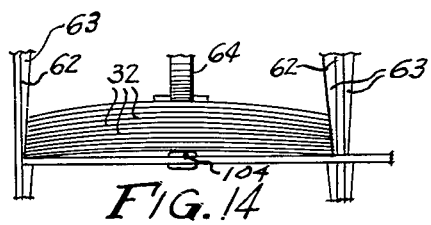
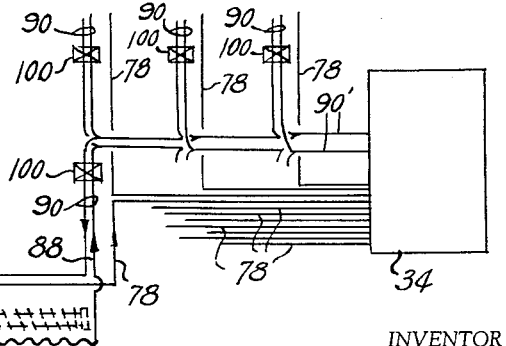
INVENTOR
WALTER S. PAWL
BY
ATTORNEY United States Patent Office 3,035,736
Patented May 22, 1962

3,035,736
RESEARCH AND INFORMATION RETRIEVAL
SYSTEM
Walter S. Pawl, 10480 Powder Mill Road, Adelphi, Md.
Filed Apr. 1, 1960, Ser. No. 19,367
10 Claims. (Cl. 221—129)

The present invention relates to research and information retrieval systems involving a large number of answers to corresponding specific questions included in a wide field of knowledge covered by a large library of references.

The main feature and object of the present system is to provide immediate information which is substantially exhaustive on any sufficiently specific question to be contained on a card of a selected size, the information including besides the information itself, references to source authorities and publications containing further pertinent information.

A further object is to make this system as compact and practicable as possible.

Figure 3:
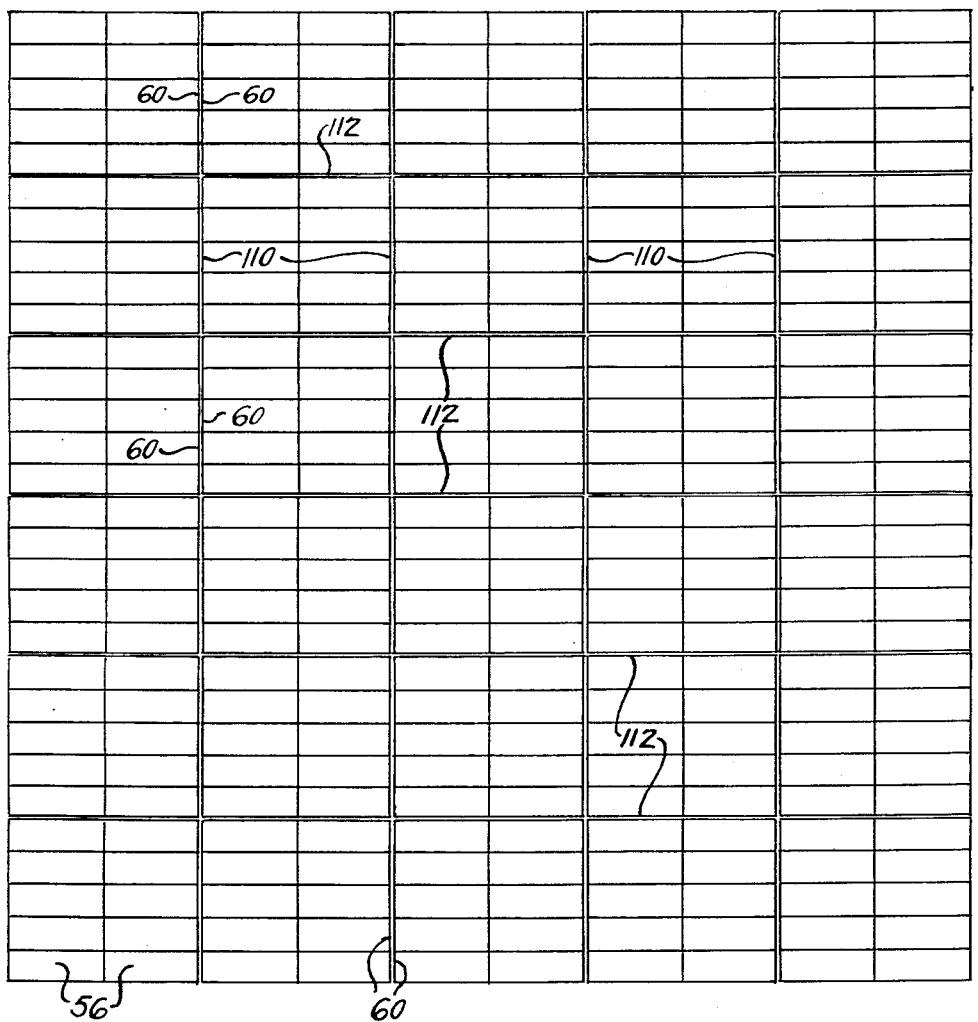
Figure 4:
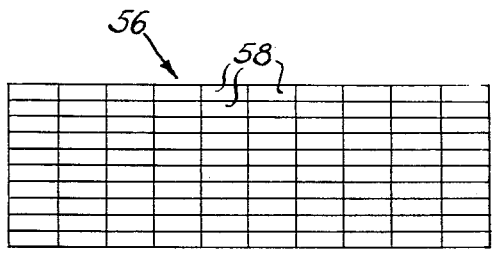
Figure 5:
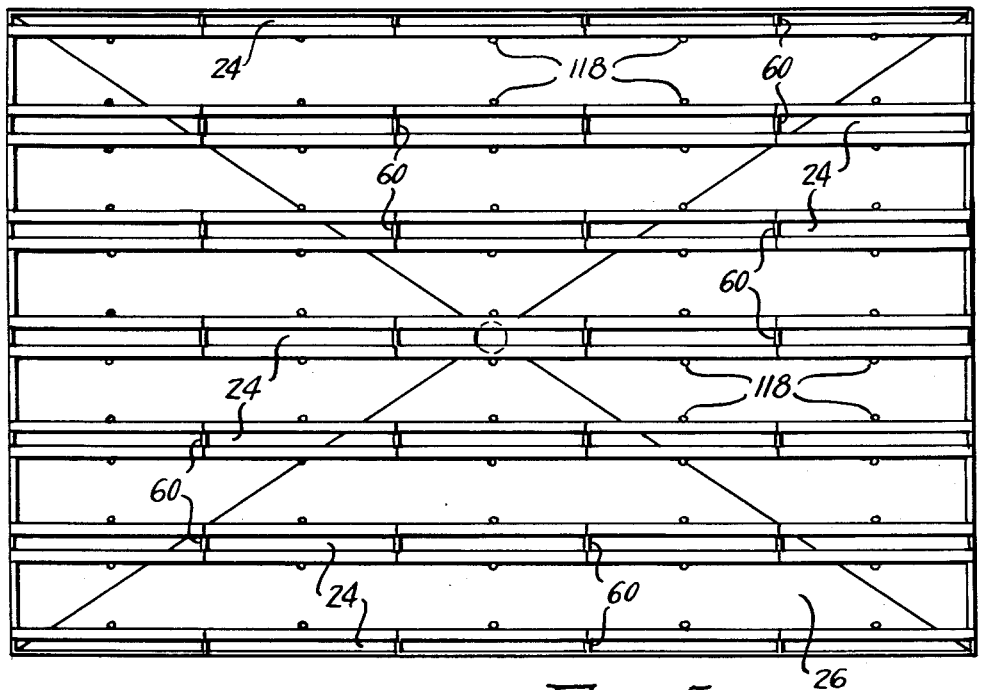
Figure 6:
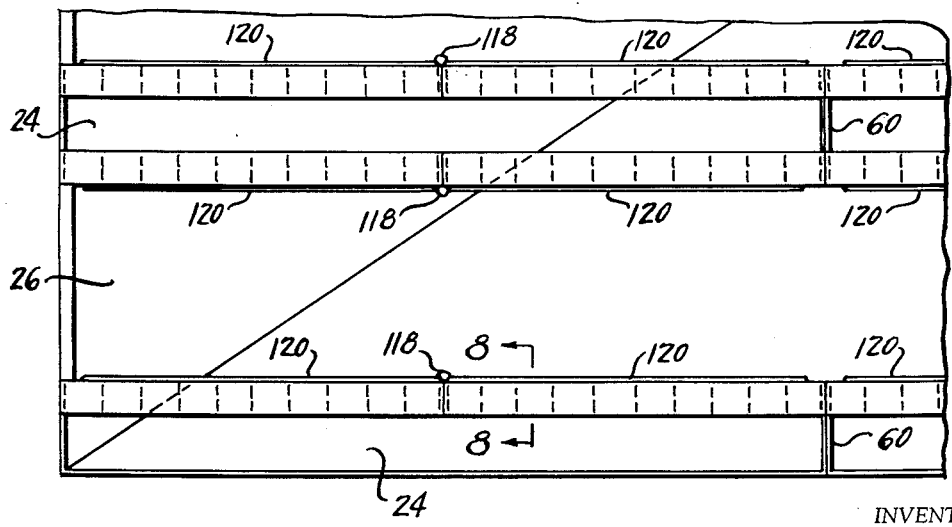
Figure 7:
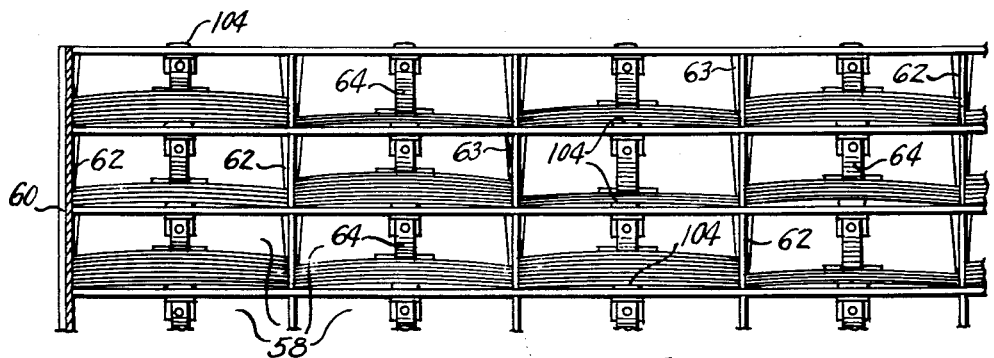
Figure 8:
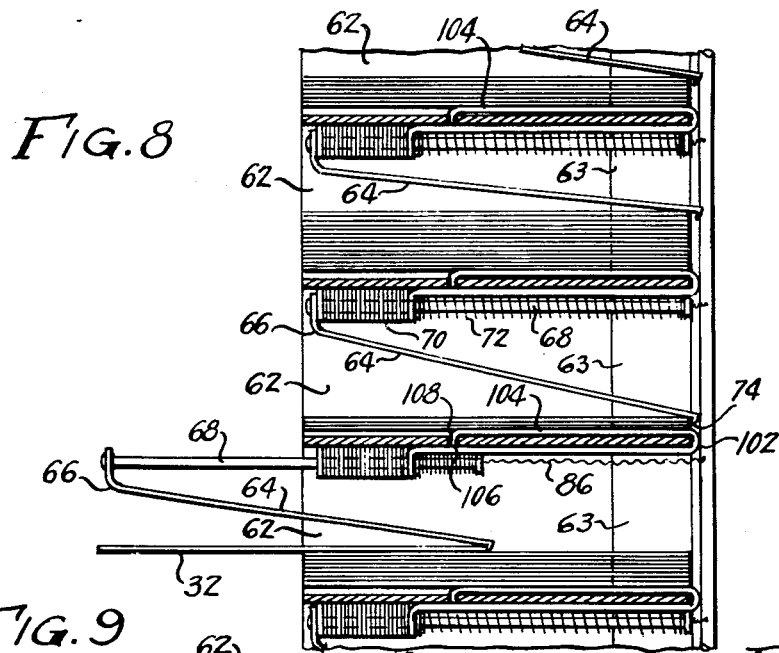
Figure 9:
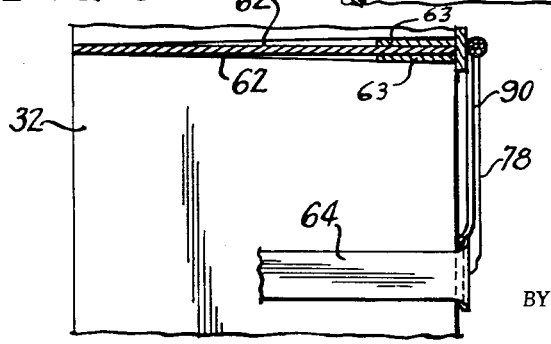
Figure 10:
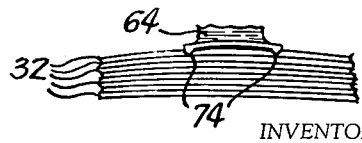
Figure 11:
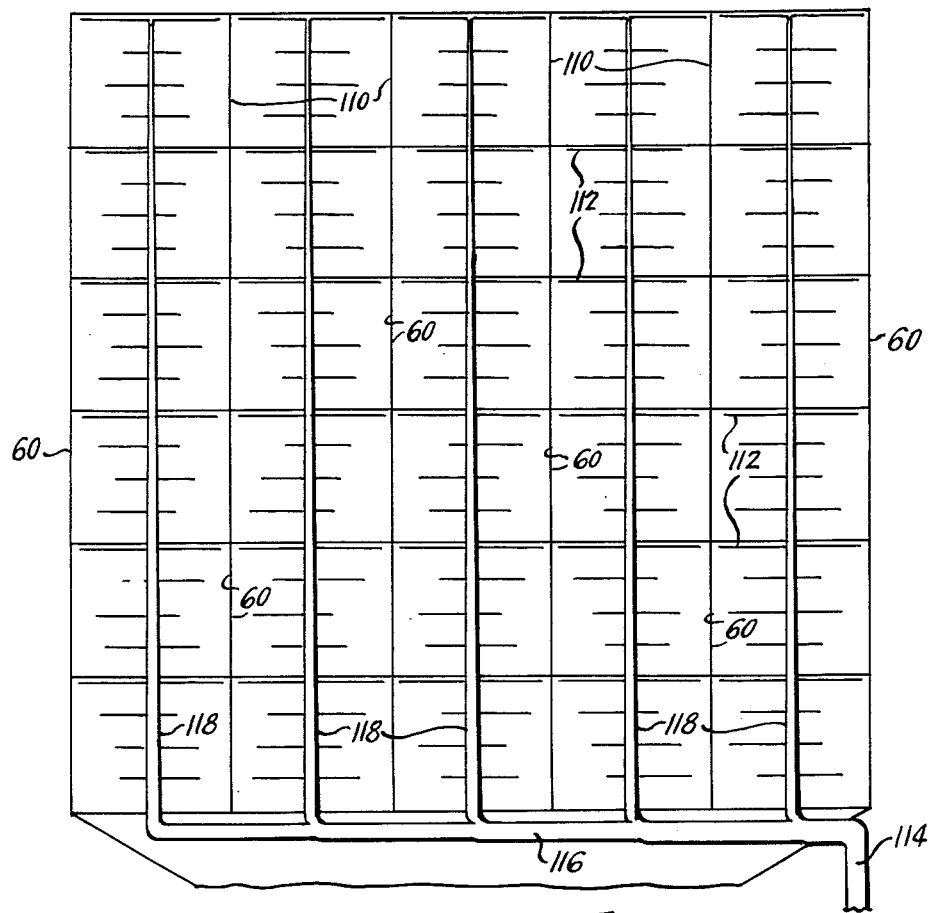
Figure 12:
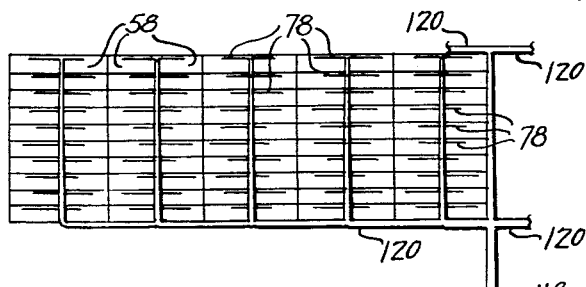

Other and more specific objects will become apparent in the following detailed description of a preferred form of the invention, as illustrated in the accompanying drawings, wherein:

FIG. 1 is a perspective view of a general arrangement of parts of a system constructed in accordance with the present invention, FIG. 2 shows a corresponding perspective view of a single tier of five sections, such as shown in the broken part of the view in FIG. 1, FIG. 3 is a rear elevational view of a single stack comprising six of such tiers, twelve of which stacks are used in the illustrated form of this system, FIG. 4 is an enlarged front view of one of the ten subdivisions in each section, showing one hundred compartments from each of which the corresponding information cards are to be selectively and individually dispensed, FIG. 5 is a top plan view of the assembly of the twelve stacks comprising this system, FIG. 6 is an enlarged top plan view of a corner portion of the assembly, FIG. 7 is an enlarged rear elevational view of a portion of a subdivision, such as shown in FIG. 4, with a supply of information cards, indicating some of the details of the individual card dispensers, FIG. 8 is a further enlarged detail sectional view taken on the line 8—8 in FIG. 6, FIG. 9 is a sectional plan view through one of the vertical partitions and portions of adjacent chambers, FIG. 10 is a further enlarged detail elevational view of the front end of a dispenser arm, FIG. 11 is a front view of the stacks, showing the main cable harness, FIG. 12 is an enlarged view of the front of a subdivision, showing a branch cable harness connected into one of the vertical cables of the main cable harness, FIG. 13 shows one form of solenoid circuit operated by the selective control means, and some of its detail circuits for operating a selected card dispenser, FIG. 14 shows an exaggerated upward taper in the width of the dispenser chamber and its effect on the air film between cards, and FIGS. 15 to 17 are side, end and top plan views of one form of motorized crane-type elevator conveyance that may be used for enabling an attendant to reach any part of the stacks and service the racks.

Industry as well as the Government is increasingly turning to research, especially to applied research. This research trend has created a demand for systems for quick retrieval of specific information in various fields of knowledge to solve problems presented in the course of working on any research project, not only in answer to questions as to what has already been done or discovered but what can or might be further done to solve a specific problem.

The present system is applicable to any field of knowledge which might be covered by many volumes of books comprising a total record of thousands of paragraphs, each of which may be abstracted on an information card and labeled by a specific topical question or title, to which it is primarily the answer or about which it is the latest information respectively. Each of the above paragraphs, with references to other paragraphs where further or related information or citations might be found, may be contained on a card that can be instantly obtained by dialing a number given to it in an alphabetical listing of these topics or titles, and the present system is intended to be a great step in providing a most economical and instant retrieval of the latest information, and will speed up the solutions of many problems now requiring hundreds of volumes of books and a vast amount of valuable time in foundering through them in search for the desired group of paragraphs of information, which may be scattered in just as many different volumes. Of course, instead of an alphabetical listing of the topics, any other classified arrangement may be used in the dial number listing.

Thus, in the field of law e.g., a complete restatement of the entire American law, such as is recorded in the paragraphs of Corpus Juris Secundum (about 100,000 pages) coud be reproduced on cards entitled in accordance with the specific paragraph or paragraphs (about ¼ page) which they contain, and a number of copies of each card could be supplied to the corresponding dispenser compartment in the present system, one copy of which would be dispensed at a time, selectively, whenever desired, by using a central dialing selector means for operating the proper dispenser, the dispensed card being immediately conveyed by gravity to the central station. Any known dial selector means 34—34' may be used, and may be coin controlled, in known manner, to dispense selected cards at 5 or 10 cents a piece to pay for the installation and operation of facilities required. For smaller systems covering only a few thousand questions in more restricted and specialized fields the dial selector means could be replaced by individual switches mounted on a large panel extending around the sides of the funnel 26.

The principal advantages thus obtained are the savings in time and expense for retrieving desired information, when time is often of the essence, if not critical, in quickly arriving at a successful solution to a problem, and particularly if the customer does not himself possess the expensive library required to supply the necessary information in his business or profession. For a few cents, almost instantly, he can receive any pertinent information, which normally might require hours of research and transcription in an expensive library which would have to be maintained, to keep the information within easy reach.

The present system comprises an assembly of stacks of dispenser compartments as shown in FIG. 1, and is designed for a capacity of 360,000 compartments with the capability of expansion to a million or more by simply adding sections to the top of the stack. The system can similarly be designed for smaller as well as larger capacities according to the scope or extent of any field of information that may be covered, with room for reasonable expansion as new developments provide more knowledge to be covered by additional cards in additional compartments, as well as by revisions of existing cards as new discoveries may dictate.

The cost of the present system should not exceed an amount which it is believed could be recovered within a comparatively short period in the value of time and expenses which could be saved by even a small staff of research men, to whom it might be made available. The resulting advance in the rate of progress would furthermore mean a decisive victory over competitors working in similar fields and would encourage a step up in the pace in development in those fields of interest or industry, whether they be military, scientific, administrative or legal, or in any particular branches thereof. In the field of mathematics as applied to missile problems, the use of this system might alter the overall rate of advance in our favor over competitive countries, and cut down the present waste of time and materials resulting from too much reliance on trial and error methods in order to reach this goal.

The present assembly, as illustrated in FIG. 1, includes five double rows of stacks 20 flanked by single rows of stacks 22 at the ends of the assembly. The faces of the adjacent rows are spaced by aisles toward which the fronts of the stacks are faced, so that the compartments might be serviced through their open front ends. A drop space 24 is provided back of the single stacks, and between the backs of the double stacks. The rear of the compartments opens into this drop space, so that the cards may be dispensed into it, whence they fall into a funnel or chute 26 at the bottom of the assembly and fall out at the outlet 28 to the receiving station at the central delivery table 30. These spaces back of the stacks are wider than the longest dimension of the standard card 32 which may be of any suitable size, e.g. 3 x 4 inches.

The dial selector control and operating means is housed in a portion of the space around the funnel, comprising the enclosure 34, the outside walls of which may serve as panels having a multiplicity of individual dispenser operating switches numerically arranged which may be selected directly in place of using the dial selector for the smaller capacity systems, involving up to only a few thousand compartments.

One or more copies of the directory or index 36, listing the numbers of the individual compartments where the indexed information cards are stored, may be kept on hand on the table 30 while other copies may be distributed to customers who wish to order by phone or messenger.

Although only one form of apparatus used for restocking of the dispensed information cards is shown in the present disclosure, any system for restocking depleted compartments with additional cards through the compartment openings in the front faces of the stacks, may be designed. E.g. a monorail 40 for a travelling crane type of one man elevator 42 could be installed over the top of each aisle 38 between the front faces of the stacks, and the elevator 42 suspended therefrom by a winch line 44 could be provided with a saddle seat 46 for the servicing attendant, and suitable racks 48 for holding a supply of the various cards 32 to be restocked, and control switches 50 for moving the elevator vertically or horizontally to the desired compartment locations.

The stacks 22 comprise six tiers 52 of five sections 54 in each tier, each section having ten subdivisions 56, and each subdivision having 100 individual compartments 58.

The end walls 60 of each section 54 are extended from the rear edges of the sections across the drop space 24, and are strong enough to support the weight of the superposed structure with a safe margin, so that additional sections may be safely added to the top of the stacks, if the system should need expansion.

In the double row stacks, the end walls or upright 60 of the sections in one stack are extended across the drop space 24 to join corresponding end walls 60 of the opposite sections in the other stack, thus providing more stability in the assembly. Interlocking offset surfaces or dowels may be provided between the joining surfaces of adjacent end walls and their superposed ends, to hold them firmly in proper alignment, thus relieving the intermediate structure from undue stresses and possible strains.

Any simple card dispenser means may be used in this system that can be electrically operated. One form of this type of dispenser is illustrated in detail in FIGS. 7 to 10. The compartments 58 are made uniformly precise in width with smoothly finished vertical sides 62 and the cards 32 are uniformly made with a slightly oversized width, so that every card in the stack placed in a compartment will be substantially gripped along its side edges between the sides of the compartment, to prevent inadvertent displacement of any of the cards below the uppermost when it is being dispensed.

The dispensing arm 64 is of leaf spring material which may be slightly concave in section on its upper side to provide suitable stiffness and confine its resilient bend to a portion near the end 66, where it is mounted on the rear end of a solenoid armature rod 68 which is actuated by an electrical impulse passed through the coil 70 against the bias of a light spring 72 which normally retains the armature rod in its forward position when the solenoid is not energized. In this position of the armature rod, the lower end of the dispensing arm 64, which has a pair of downwardly extending tiny barbs or knife edges 74, not longer than the thickness of one card, extends just over the front edge of the stack of cards. Thus during the energization of the solenoid, the uppermost card is slid off the stack rearwardly to a position where its center of gravity is over the rear edge of the stack, so that as arm 64 returns to its normal position, after deenergization of the solenoid, the barbs 74 being slightly inclined rearwardly will glide over the next card without disturbing it, and the uppermost card will topple over and fall through the drop space 24 down through the funnel to the table 30.

The solenoids 70 for operating the individual dispenser arms 64 in response to the selective grounding of their separate control lines 78, comprise a simple electromagnetic coil 80 for moving the armature rod 68 on its operating stroke and a coil spring 72 for returning the armature to its inoperative position, assisted by a very light spring conductor 86. This conductor is mounted alongside spring 72 and serves as an electrical connection of main ground line 88 in the current supply cable 90 to the main control switch contact 92 mounted on the end of spring 72 which is normally slightly spaced from the ground contact 94 of the coil 80, as shown. This ground contact is also connected directly to the control line 78. When control line 78 is selectively grounded by the selective dialing system, coil 80 is grounded through the comparatively high resistance of the control line, and thus activates the armature rod 68 with a weak impulse, but sufficiently to close the contacts 92 and 94. Contact 94, being now connected through spring 86 to the main ground line 88, immediately sends a high current through the coil 76, giving the armature rod 68 its full operating impulse. Obviously, main ground line could be connected directly to contact 92, with the same results. A thermostat switch 100 in the main current supply cable 90, opens the supply circuit temporarily while the selective system disconnects the control line 78 from ground. Thus the dispenser is ready for the next dial controlled operation.

In order to improve the operation of the dispenser, the sides 62 of the chamber may be provided with strips 63 tapered slightly in the upward direction, as shown, to assure better separation of the cards in pulling off a single card off the top of the stack, by providing increased arches in them as they approach the top of the stack, so as to increase the air film between successive cards and thus avoid any suction-sticking of successive cards to the card being dispensed. This upward taper of the width of the chamber is exaggerated in FIG. 14 to show the effect more clearly. Of course the arching of the cards also provides longitudinal stiffness to the cards so that the barbs 74 will not have a tendency to curl the edge of the card upwardly and slip off of it instead of moving the entire card off the stack.

The solenoid unit has a clip 102, by means of which it is fixed to the top of the compartment 58 which is the bottom of the next compartment above it. The upper arm 104 of the clip has a detent or tooth 106 that is sprung into a corresponding opening or notch 108 in the bottom of the upper compartment, to hold the device firmly in place. The arm 104 provides a rest for the top of the arch of the lowermost card in a stack.

As shown in FIG. 3, the double walled upright support columns 110, formed of the rigidly interlocked and superposed pairs of adjacent end walls 60 of sections 54 provide a strong supporting framework, connected by double horizontal interlocked upper and lower walls of adjacent tiers of these sections forming the main cross braces 112 between support columns 110. In the double stacks, this framework is made even stronger by joining the portions of the columns extended across the common drop space 24 back of each stack.

In the presently illustrated system 360 thousand lines 78 from the selector system 34 are distributed to twelve 30 thousand-line cables 114 leading to the twelve cable harnesses, one of which serves each of the twelve stacks. FIG. 11 shows the front of a stack with the cable harness mounted in place. The horizontal base portion 116 of the harness starts with the 30,000-line cable 114 and branches off with a 6,000 line vertical cable 118 up the middle of each column of sections 54. 100-line branches 120 are distributed to each subdivision 56 from opposite sides of the vertical cable 118. Branches 120 form the harnesses for the final distribution of each of the 100 lines to the individual compartments 58, as shown in FIG. 12.

A current supply cable 90' is passed from a source at the selective control system through or alongside the main cables and is branched out through all the branches in the harness up to the individual solenoid units. The selective control system 34 may obviously be of any known form, such as the telephone dialing system, or a manually selective multi-switch system for grounding a selested line 78, to dispense the desired information card. Thus, each of the solenoid units 76 is supplied with three leads; one from the selective control line 78, a second from the main ground line 88 in cable 90, the other or live line in cable 90 providing the third lead. The coil 80 serves a double purpose: first as the relay coil when the fine high resistance line 78 is grounded, so as to bring contacts 92 and 94 together, then as the solenoid coil to operate armature 69 through its card discharging stroke.

Obviously, instead of using the travelling crane elevator for servicing purposes, the rack assembly could be provided with grill-type platforms 25 as indicated in FIG. 1, which could be made accessible by ladders or stairs (not shown).

Many other obvious modifications in details and arrangements of parts could be made without departing from the spirit and scope of the present invention as defined in the appended claims.

What is claimed is:
1. An information retrieval system comprising a series of uniformly sized cards, each having a specific piece of information thereon pertaining to a specific question in a particular field of knowledge, a plurality of stacks of substantially rectangular compartments open at the front and rear of said stacks and formed by vertically spaced shelves and vertically aligned partitions between shelves at intervals corresponding to the width of said cards, the width of the shelves corresponding to the length of said cards, each compartment providing space for storing a stack of duplicate cards containing the same piece of information and means for dispensing one card at a time from said stack of cards through the rear of said compartment, the ends of said shelves being supported by uprights forming the end walls of the corresponding end compartments in each stack, said uprights being extended to the rear of said stacks to form side walls of drop spaces back of the corresponding stacks, chute means extending from the bottom of said side walls for receiving dropped cards from said stacks and delivering them to a receiving station below said stacks, and control means at said receiving station for operating selected dispensing means in accordance with a desired piece of information.

2. A system as defined in claim 1, said dispensing means being electrically operated and including a solenoid having a coil and an armature with a feeder arm for sliding the upper card in the compartment out through the rear opening, and three electrical leads to said solenoid coil, two of said leads being connected to the opposite ends of said coil, the third lead being connected to a movable contact for closing a connection at one end of said coil.

3. A system as defined in claim 2, said operating means comprising a source of direct current, a cable system having a fine ground line for each dispensing means connected to one of said two leads, said fine ground lines being collected through branch cables to a main cable, a common selector means at the end of said main cable for switching a ground connection to the end of a selected fine ground line, and a live line from said source branched to all said dispensing means for connection to the other of said two leads.

4. A system as defined in claim 3, and a main ground line extended in parallel with said branched live line for connection to said third lead, said movable contact closing a connection at the end of the coil to which the fine ground line is connected in response to the initial weak energization of said solenoid due to the grounding of said fine ground line so as to provide a full energization of said solenoid for the completion of the operating stroke of said armature and feeder arm.

5. A system as defined in claim 4, said selector control means comprising a dialing system and a dial at the control station.

6. A system as defined in claim 1, said plurality of stacks including pairs of stacks connected back to back to provide a common card dropping space between them, and rows of stacks aligned end to end, adjacent stacks having common intermediate uprights.

7. A system as defined in claim 1, said plurality of stacks including rows of aligned stacks end to end, said rows facing each other and being spaced to provide service aisles for servicing the compartments in adjacent stacks.

8. A system as defined in claim 7, and service platforms in said aisles at suitable heights to provide access to all compartments.

9. A system as defined in claim 7, and suitable transportation means in said aisles providing access to all compartments for servicing purposes.

10. A system as defined in claim 9, said transportation means comprising a travelling crane type elevator mounted for operation in said aisles.

References Cited in the file of this patent
UNITED STATES PATENTS

| | | |
|---|---|---|
| 1,564,383 | Varcoe | Dec. 8, 1925 |
| 2,386,520 | Watson et al. | Oct. 9, 1945 |
| 2,446,643 | Farmer | Aug. 10, 1948 |
| 2,476,877 | Knott et al. | July 19, 1949 |
| 2,590,736 | Tandler et al. | Mar. 25, 1952 |
| 2,665,775 | Smith | Jan. 12, 1954 |
| 2,698,699 | Skillman | Jan. 4, 1955 |